US009428706B2

(12) United States Patent
Chornet et al.

(10) Patent No.: US 9,428,706 B2
(45) Date of Patent: Aug. 30, 2016

(54) METHOD FOR LOW-SEVERITY GASIFICATION OF HEAVY PETROLEUM RESIDUES (75) Inventors: Esteban Chornet, Quebec (CA); Aca Mincic, Quebec (CA); Martin Gagnon, Quebec (CA); Boris Valsecchi, Quebec (CA)

(73) Assignee: AFINA ENERGY INC., Montreal, Quebec (CA)

( * ) Notice: Subject to any disclaimer, the term of this patent is extended or adjusted under 35 U.S.C. 154(b) by 685 days.

(21) Appl. No.: 12/520,688

(22) PCT Filed: Dec. 10, 2007

(86) PCT No.: PCT/CA2007/002224
§ 371 (c)(1),
(2), (4) Date: Jun. 22, 2009

(87) PCT Pub. No.: WO2008/077233
PCT Pub. Date: Jul. 3, 2008

(65) Prior Publication Data
US 2010/0024300 A1  Feb. 4, 2010

(51) Int. Cl.
*C01B 3/52* (2006.01)
*C10J 3/84* (2006.01)
(Continued)

(52) U.S. Cl.
CPC ... *C10L 9/06* (2013.01); *C01B 3/52* (2013.01); *C10J 3/463* (2013.01); *C10J 3/482* (2013.01); *C10J 3/84* (2013.01); *C10K 1/004* (2013.01); *C10K 1/005* (2013.01); *C10K 1/026* (2013.01); *C10K 1/101* (2013.01); *C01B 2203/0415* (2013.01); *C01B 2203/0475* (2013.01);
(Continued)

(58) Field of Classification Search
USPC ........................................................ 48/197 R
See application file for complete search history.

(56) References Cited

U.S. PATENT DOCUMENTS

| 3,971,639 A | 7/1976 | Matthews |
| 4,095,960 A | 6/1978 | Schuhmann, Jr. |

(Continued)

FOREIGN PATENT DOCUMENTS

| CA | 1093821 | 1/1981 |
| CA | 2418700 | 2/2003 |

OTHER PUBLICATIONS

Bonk, D.L., Coal Gasification as Alternative Fuel for Glass Industry, National Energy Technology Laboratory, U.S. Department of Energy, Conference presented at Owens Corning Corporate Headquarters, Toledo, OH (Jul. 27, 2005).

(Continued)

*Primary Examiner* — Matthew Merkling
(74) *Attorney, Agent, or Firm* — Novak Druce Connolly Bove + Quigg LLP.

(57) ABSTRACT

A method for co-producing a sulfur-containing raw synthetic gas and an essentially desulfurized solid residue from a sulfur-containing heavy petroleum residue feedstock, comprising feeding a bubbling fluidized-bed gasification reactor with the feedstock, and converting the feedstock to a raw synthetic gas by a partial oxidation reaction in the presence of water at a temperature at or below about 1000° C. and a pressure at or below about 10 atm, thereby also producing an essentially desulfurized solid residue, while the sulfur components are essentially comprised in the raw synthetic gas; and separately recovering the essentially desulfurized solid residue and the sulfur-containing raw synthetic gas.

31 Claims, 4 Drawing Sheets (51) Int. Cl.
| | |
|---|---|
| *C10L 9/06* | (2006.01) |
| *C10J 3/48* | (2006.01) |
| *C10J 3/46* | (2006.01) |
| *C10K 1/00* | (2006.01) |
| *C10K 1/02* | (2006.01) |
| *C10K 1/10* | (2006.01) |

(52) U.S. Cl.
CPC . *C01B2203/0485* (2013.01); *C01B 2203/0495* (2013.01); *C10J 2300/094* (2013.01); *C10J 2300/0906* (2013.01); *C10J 2300/0923* (2013.01); *C10J 2300/0943* (2013.01); *C10J 2300/0956* (2013.01); *C10J 2300/0983* (2013.01); *C10J 2300/169* (2013.01); *C10J 2300/1807* (2013.01); *C10J 2300/1838* (2013.01); *Y02C 20/20* (2013.01); *Y02E 20/18* (2013.01)

(56) References Cited

U.S. PATENT DOCUMENTS

| | | | |
|---|---|---|---|
| 4,154,581 A | 5/1979 | Nack et al. | |
| 4,781,731 A | 11/1988 | Schlinger | |
| 4,801,438 A | 1/1989 | Najjar et al. | |
| 4,917,024 A * | 4/1990 | Marten et al. | 110/233 |
| 5,213,587 A * | 5/1993 | Ekstrom et al. | 48/197 R |
| 5,597,474 A | 1/1997 | Kerby et al. | |
| 2004/0045272 A1* | 3/2004 | Miyoshi et al. | 60/39.12 |
| 2004/0182000 A1* | 9/2004 | Mansour et al. | 48/197 FM |

OTHER PUBLICATIONS

Furimsky, E., Gasification in Petroleum Refinery of 21st Century, Oil & Gas Science and Technology—Rev. IFP, 54 (5), pp. 597-618 (1999).
Gasification—NFCRC Tutorial, National Fuel Cell Research Center, University of California, Irvine, http://www.nfcrc.uci.edu/EnergyTutorial/toc.html (Jul. 27, 2006).
Gray, D. et al., Opportunities for Petroleum Coke Gasification Under Tighter Sulfer Limits for Transportation Fuels, Presented at 2000 Gasification Technologies Conference, San Francisco, CA (Oct. 8-11, 2000).
Higman, C. et al., Gasification, Burlington, MA, Gulf Professional Publishing, pp. 101-104 and 109-128 (2003).
Holt, N. (1999) What's in the Pipeline? New Projects and Opportunities, Presented at 1999 Gasification Technologies Conference, San Francisco, CA (Oct. 17-20, 1999).
Pulp and Paper Sludge to Energy—Preliminary Assessment of Technologies, CANMET Energy Technology Centre, ADI Limited, Report: (34) 0173-479.1 (Mar. 31, 2005).
The Rectisol® Process: Lurgi's leading technology for purification and conditioning of synthesis gas.
Schwager, J. et al., European Waste Gasification: Technical & Public Policy Trends and Developments, Juniper Consultancy Services Ltd., Presented at Gasification Technologies Conference 2002, San Francisco, CA (Oct. 28, 2002).
Schwager, J. et al., Progress Towards Commercialising Waste Gasification: A Worldwide Status Report, Juniper Consultancy Services Ltd., Presented at Gasification Technologies Conference, San Francisco, CA (Oct. 14, 2003).
Shelton, W. et al., KRW Gasifier IGCC Base Cases—PED-IGCC-98-005, Process Engineering Division (Sep. 1998, rev. Jun. 2000).
Wallace, P.S. et al., Heavy Oil Upgrading by the Separation and Gasification of Asphaltenes, Presented at Gasification Technologies Conference, San Franciscio, CA (Oct. 1998).
Botton, R., Lits fluidises pour l'industrie chimique. Extrapolation et amelioration des catalyseurs, Oil & Gas Science & Tech., rev. IFP, vol. 54, No. 5, pp. 620-640 (1999).
Pyrolyse et Gazeification de la Biomasse pour la Production D'Electricite, Procedes et Acteurs (Oct. 2001).
Furimsky et al., "Gasification reactivities of cokes derived from Athabasca bitumen", Fuel Processing Technology (1985) 11(2): 167-182.
Watkinson et al., "Gasification of oil sand coke", Fuel, IPC Science and Technology Press (1989) 68(1): 4-10.

* cited by examiner

METHOD FOR LOW-SEVERITY GASIFICATION OF HEAVY PETROLEUM RESIDUES

CROSS-REFERENCE TO RELATED APPLICATIONS

This application is a §371 national stage entry of International Application No. PCT/CA2007/002224, filed Dec. 10, 2007, which claims priority to Canadian Application No. 2,572,447, filed Dec. 22, 2006, both of which are incorporated herein in their entirety by reference.

FIELD OF THE INVENTION

The present invention relates to a method for low-severity gasification of heavy petroleum residues. More specifically, the present invention is concerned with the low-severity gasification of petroleum coke and asphaltenic-rich residues.

BACKGROUND OF THE INVENTION

The current production of heavy oil involves the use of large amounts of high-pressure steam injected in the geological zones where the heavy oil is embedded (for example in Steam-Assisted Gravity Drainage—SAGD). During the extraction process, the temperature in the steam-injection zone is increased, causing a reduction of the heavy oil viscosity. The heavy oil then drains towards a collector from which it is pumped to the surface, where it is recovered for in situ upgrading or transportation to an upgrader.

Approximately, the enthalpy contained in 1 barrel (bbl) of oil needs to be consumed to produce the steam in order to lift 3 to 4 bbl of heavy oil. The cost of the heavy oil extraction is thus significantly dependent on the cost of the steam produced.

Steam for such operations may be produced by combustion of petroleum coke, vacuum bottoms, heavy oil itself or its asphaltenic fractions once separated from the oil. However, the presence of sulfur, nitrogen and metals (V and Ni for example) in these feedstocks require extensive treatment of the large amount of flue gases generated during combustion to lower particulate and pollutant emissions to below regulatory levels. The presence of vanadium may also be a problem for the refractory present in the boilers used for the combustion which typically operate at high temperatures. Indeed, in an oxidative medium, $V_2O_5$ tends to form, which compound has a melting point of 690° C., and to readily create deposits on the refractory walls of combustion boilers, which causes operational problems with time on stream. In addition, combustion does not permit an easy and economical recovery of $CO_2$.

The use of natural gas constitutes an alternate approach to generate the required steam: gas-fired boilers are compact devices and less expensive than boilers for the feedstocks previously specified. However, natural gas pricing is subject to market fluctuations which inevitably influence the heavy oil extraction costs.

An economic alternative to natural gas itself is gasification. There is extensive literature on gasification processes. Gasification processes in petroleum refinery can generally be classified in three broad categories with regard to the gasifier used, namely:

(a) Fixed bed (also called moving bed) gasification;
(b) Bubbling fluid bed gasification; and
(c) Entrained/circulating bed gasification.

With respect to the gasification of refinery residues, the entrained bed gasifiers are usually considered the gasifiers of choice. Well-known examples of such commercial gasifiers include those by Texaco, Dow (E-gas process) or Shell (Higman, C. and van der Burgt, M. (2003). *Gasification*. Burlington, Mass., Gulf Professional Publishing, an Elsevier imprint., pp 109-128). They involve high temperatures in the reaction zone, approaching 1500° C., to ensure high gasification rates resulting in at least 98% carbon conversion. The high temperatures attained in these gasifiers make them suitable for the gasification of less reactive feedstocks, such as petcoke. However, such high temperatures also imply rather high operational costs and require large scale-ups (about 100,000 bbl per day and more) to absorb the costs.

A conventional fluid bed configuration derived from Winkler's initial low severity fluid bed design (Higman, C. and van der Burgt, M. (2003), Id. pp 101-104) was originally designed for coal gasification. Such low severity configuration has not been considered satisfactory for carbonaceous matrices such as petcoke due to the low reactivity of the carbon structures present in petcoke. The requirements for higher severities have led to a higher severity version of the Winkler design (often referred to as the High Temperature Winkler gasifier, although the most noticeable development has been the increase of pressure) and, ultimately, to more complex circulating beds and entrained bed configurations.

It has been desired for quite a long time in the oil industry that gasification of heavy petroleum residue-derived feedstocks, which generally have a rather high sulfur content, be performed under low severity conditions, that is to say below about 1000° C. and below about 10 atm, while guarantying a balance between reasonable operational costs and commercially satisfying conversion rates. However, such a gasification process still has to be developed.

Therefore remains a need for a low-cost method to produce a synthetic gas from a low value, poorly reactive feedstock consisting of sulfur-containing heavy petroleum residues.

The present description refers to a number of documents, the content of which is herein incorporated by reference in their entirety.

SUMMARY OF THE INVENTION

The present invention generally relates to a method of low-severity partial oxidation (gasification) of sulfur-containing heavy petroleum residues, which produces a raw synthetic gas that, before any conditioning step, comprises most of the sulfur components originally present in the feedstock. The method according to the present invention also produces an essentially desulfurized solid petroleum residue.

More specifically, in a particular embodiment, the present invention relates to a method for the co-production of a sulfur-containing raw synthetic gas and an essentially desulfurized solid residue from a sulfur-containing heavy petroleum residue feedstock, comprising:

(a) providing a particulate sulfur-containing heavy petroleum residue feedstock;

(b) feeding a bubbling fluidized-bed gasification reactor with the feedstock, and converting the feedstock to a sulfur-containing raw synthetic gas by a partial oxidation reaction of the feedstock in the presence of water at a temperature at or below about 1000° C. and a pressure at or below about 10 atm, thereby also producing an essentially desulfurized solid residue; and (c) separately recovering the essentially desulfurized solid residue and the sulfur-containing raw synthetic gas.

In another particular embodiment, the present invention relates to a method for gasifying a sulfur-containing petroleum heavy residue feedstock under low severity conditions, comprising:

(a) providing a particulate sulfur-containing heavy petroleum residue feedstock;

(b) feeding a bubbling fluidized-bed gasification reactor with the feedstock, and converting the feedstock to a sulfur-containing raw synthetic gas by a partial oxidation reaction of the feedstock in the presence of water at a temperature at or below about 1000° C. and a pressure at or below about 10 atm, thereby leaving an essentially desulfurized solid residue; and (c) selectively recovering the sulfur-containing raw synthetic gas.

In another particular embodiment, the present invention relates to a method for the co-production of a sulfur-containing raw synthetic gas and an essentially desulfurized solid residue from a sulfur-containing heavy petroleum residue feedstock, comprising:

(a) feeding a particulate sulfur-containing heavy petroleum residue feedstock into a bubbling fluidized-bed gasification reactor;

(b) converting the sulfur-containing heavy petroleum residue feedstock to a sulfur-containing raw synthetic gas by a partial oxidation reaction of the feedstock, the partial oxidation reaction taking place in the bubbling fluidized-bed gasification reactor in the presence of water and a partial oxidation agent at a temperature of 1000° C. or less and a pressure of about 10 atm or less, thereby also producing an essentially desulfurized solid residue; and (c) separately recovering the essentially desulfurized solid residue and the sulfur-containing raw synthetic gas, wherein all reactions involved in the co-production method, including consumption of $O_2$ as an oxidant from the partial oxidation agent, steam-reforming reactions, carbon-steam reactions and cracking reactions, take place in the bubbling fluidized-bed gasification reactor at 1000° C. or less, along with the partial oxidation reaction.

In another particular embodiment, the present invention relates to a method for gasifying a sulfur-containing petroleum heavy residue feedstock under low severity conditions, comprising:

(a) feeding a particulate sulfur-containing heavy petroleum residue feedstock into a bubbling fluidized-bed gasification reactor;

(b) converting the sulfur-containing heavy petroleum residue feedstock to a sulfur-containing raw synthetic gas by a partial oxidation reaction of the feedstock, the partial oxidation reaction taking place in the bubbling fluidized-bed gasification reactor in the presence of water and a partial oxidation agent at a temperature of 1000° C. or less and a pressure of about 10 atm or less, thereby also producing an essentially desulfurized solid residue; and (c) selectively recovering the sulfur-containing raw synthetic gas, wherein all reactions involved in the gasification method, including consumption of $O_2$ as an oxidant from the partial oxidation agent, steam-reforming reactions, carbon-steam reactions and cracking reactions, take place in the bubbling fluidized-bed gasification reactor at 1000° C. or less, along with the partial oxidation reaction.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

In general terms, the present invention relates to a method for the gasification of heavy petroleum residues under low severity conditions.

Still in general terms, from another point of view, the present invention relates to a method for the co-production, under low severity conditions, of a sulfur-containing raw synthetic gas and of an essentially desulfurized solid petroleum residue from sulfur-containing heavy petroleum residues.

As used herein when referring to a gasification method, the terms "low severity" mean that the method is operated at a temperature generally at or below about 1000° C. and at a pressure generally at or below about 10 atmospheres (atm.).

As used herein, the expression "heavy petroleum residue" encompasses at least petroleum coke (petcoke), asphaltenes and asphaltenic-rich residues. It also encompasses atmospheric distillation bottoms resulting from raw petroleum oil distillation at or near atmospheric pressure, as well as vacuum bottoms from vacuum distillation of petroleum, i.e. the fractions of petroleum oil that do not distil under vacuum and are produced as bottom products.

As used herein when referring to a heavy petroleum residue, the term "particulate" means that the residue is essentially composed of particles, small pieces or parts of a flowable material, such as a powder. A particulate heavy petroleum residue as used herein is adapted to be fluidized in a bubbling fluidized-bed of a gasification reactor.

As used herein when referring to a solid residue resulting from a method according to the present invention, the terms "essentially desulfurized" mean that the sulfur content is less than about 0.5 wt % (dry basis).

As used herein when referring to a synthetic gas, the terms "low calorific value" generally designate gases having higher heating values (HHV) in a range comprised between about 100 to about 310 BTU/SCF (British Thermal Unit/Standard Cubic Foot, the latter considered at 15° C., 1 atm), or between about 3.7 to about 11.5 $MJ/Nm^3$.

As used herein when referring to a synthetic gas, the term "clean" means that the synthetic gas, upon combustion, results in atmospheric emissions of particulates, metals and organics below the emission limits defined by environmental regulations.

As used herein when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

It is quite counter-intuitive to minimise the severity gasification conditions in gasifying rather inert feedstocks such as heavy petroleum residues, when however searching to achieve an acceptable carbon conversion rate and an acceptable overall process efficiency at reasonable operational costs. Indeed, low severities traditionally require longer reaction periods if high carbon conversion rates to gaseous products are targeted. This usually results in the need of large vessels. However, the low severity strategy of the present invention is based on an innovative approach that aims at a rapid conversion, under partial oxidation conditions, of a fraction of the heavy petroleum residues to gaseous products while surprisingly desulfurizing the unconverted solid residues (fixed carbon-rich). The essentially desulfurized solid residues may subsequently be safely and rapidly converted in a stoichiometric or substoichiometric thermal oxidizer.

Feedstock

One of the feedstocks used in a method according to the present invention is petroleum coke (petcoke), for example derived from thermal treatment of a wide range of bituminous and petroleum crudes.

The typical composition of such petcoke feedstock can be summarized as follows in Tables 1 and 2:

TABLE 1

| General composition range of petcoke (% w/w, dry basis) | | | | |
|---|---|---|---|---|
| Inerts (ash) | C | H | O | N + S |
| 0.2-2.0 | 85-90 | 2-4 | 0-2 | 4-7 |

TABLE 2

| Typical properties of Lloydminster Petcoke | | |
|---|---|---|
| Properties | Values | Units |
| Volatile matter | 9-13 | % w/w |
| Ash | 0.2-0.5 | % w/w |
| Sulphur | 3.0-4.5 | % w/w |
| Nitrogen | 1.5-1.7 | % w/w |
| Vanadium | 500-700 | ppm |
| Nickel | 200-400 | ppm |
| Moisture | 7-10 | % w/w |
| Fixed Carbon | 86-90 | % w/w |
| BTU value | 14,500-16,000 | BTU/lb |
| Bulk density | 640-720 | Kg/m³ |
| Size (diameter) | Up to 4 | inches |

The types of petcoke used in the method of the present invention have a typical calorific value (HHV) ranging between about 33.6 and about 37.1 MJ/kg (dry basis, corresponding to a range of between about 14500 and about 16000 BTU/lb).

Given their chemical and structural similarities with petcoke, of which they are precursors, asphaltenic-rich residues may also be converted by the process of the present invention to similar end products with similar yields. In fact, asphaltenes (i.e. a synonym for asphaltenic residues) precede the formation of petroleum coke, the latter being formed as a structured carbon matrix upon heating of asphaltenes in the absence of oxygen in coking furnaces (delayed coking or fluid coking being the techniques generally used in the industry).

The typical composition of an asphaltenic-type feedstock can be summarized as follows in Table 3:

TABLE 3

| General composition range of asphaltenes (% w/w, dry basis) | | | | | |
|---|---|---|---|---|---|
| Inerts (ash) | C | H | O | N | S |
| 1-5% | 82 ± 3% | 8 ± 1% | 0.3-5 | 0.5-3.5 | 1.0-10 |

Thus asphaltenic-type feedstocks have a generally higher hydrogen level and a less structured carbon matrix than petroleum coke, which may facilitate their gasification since the latter is, de facto, the consequence of a reaction between steam and carbon. Such reaction generally proceeds at a faster rate with functionalized carbon and with amorphous carbon (as in asphaltenes) than with structured carbon matrices such as inertinites or graphitic carbon, which structure is closer to that of petcoke.

Other organic residues, or mixtures thereof, may be used in the method of the present invention, provided the level of inorganics and their composition are similar to or lower than those recited in Table 1.

A common feature of the feedstocks used in the method of the present invention is their relatively high sulfur content, which lowers their commercial value.

Prior to gasification, the particle size distribution of the particulate feedstock may be checked, and may have to be adjusted by controlled grinding or crushing prior to gasification. The desired resulting particle diameter or distribution usually ranges between about 0.1 and about 5.0 mm, preferably between about 0.1 and 2.0 mm. Any crushing-screening unit or similar well-known technique capable of so conditioning the feedstock may be used.

Gasification Process

In a particular embodiment of the method according to the present invention, the selected heavy petroleum residue feedstock is fed into a gasifier, wherein a gasification reaction occurs, which consists in a partial oxidation reaction of the feedstock, generally with air, in the presence of water under low severity conditions. Once the oxidant from the air ($O_2$) is consumed, the predominant reaction is generally:

$$C + H_2O \rightarrow CO + H_2$$

The gasifier used in an embodiment of the method according to the present invention is a vertical cylindrical vessel, enlarged in its upper section (freeboard, with a relatively low solid concentration), and containing, in its narrower bottom section, a fluidized bed, with a relatively high solid concentration. The reactor may for example be operated under bubbling fluidization regime at velocities comprised between about 0.2 and about 1.8 m/s at reaction conditions.

The feeding point of the reactor is located just above the zone known as the jet zone. An air stream enters at the bottom of the gasifier via several tuyeres, each tuyere having several orifices through which the air velocity is generally comprised between 50 and 100 m/s, thereby ensuring fluidization and multistage reaction within the gasifier. The quantity of air used in heavy petroleum residue gasification (a partial oxidation reaction) generally ranges between about 15 and about 50%, preferably between about 30 and 50%, preferably between about 35% and about 45% of the stoichiometric amount required for total oxidation of the organic content of the feedstock. It is denoted by an equivalent ratio λ (lambda) comprised between about 0.15 and about 0.50, preferably between about 0.30 and about 0.50, preferably between about 0.35 and about 0.45. The tuyeres (also known as nozzles)

ensure an adequate, homogeneous distribution of the injected air stream. Either air or oxygen-enriched air or oxygen-enriched steam or oxygen-enriched carbon dioxide (for example recovered from the synthetic gas) may be used as partial oxidation agents.

The presence of water (as moisture in the feed and/or as added water, in a liquid and/or gaseous steam form) is essential to the gasification method. Liquid water generally acts as a heat sink for the exothermic partial oxidation and cracking reactions in the fluid bed. As well, under certain conditions, steam acts as a reactant resulting in enhanced production of reducing gases such as $H_2$ and CO.

The amount of liquid water introduced in the gasifier typically ranges between about 5 and about 20% preferably between about 10 and about 15% of the feedstock solids (dry mass). Moisture in the feedstock is generally part of this water. In a specific embodiment of the present invention, the rest of the liquid water may come from the synthetic gas scrubbing system: for example, (i) a water suspension/emulsion containing organics, tar and carbon-laden fine particulates is formed in a first scrubbing loop and is reintroduced in the gasifier for full conversion; and/or (ii) an ammonia-rich water phase is produced by stripping the ammonia absorbed in a second scrubbing loop. Such ammonia-rich water may also be reintroduced in the gasifier for the destruction of the ammonia.

The amount of steam added to the gasifier generally ranges between about 30 wt % and about 70 wt % preferably between about 40 and 70% of the feedstock solids (dry mass). Such steam may be produced by flashing the hot pressurised water that recovers heat from the synthetic gas in a heat-recovery unit prior to scrubbing.

The partial pressure of water (which becomes steam under the reaction conditions) inside the reactor may be adjusted so that the carbon-steam and steam-reforming reactions are controlled within a steam partial pressure ranging from about 0.5 to about 3 atm (about 7.4-43.1 psia).

The reactor operates at temperatures that are defined, at least in part, by the characteristics of the inorganics present in the feed as well as by the reactivity of the carbon and organics in the feed. Adjusting the airflow rate, the rate of solids to be gasified as well as the rate of addition of water/steam may thus set the temperature of the gasifier. Operational temperatures of about 1000° C. or less, preferably ranging between about 780° C. and about 1000° C. are used in a method according to the present invention. When a high carbon conversion is targeted, the reaction temperature preferably ranges between about 950 and about 980° C.

Pressures (absolute) of about 10 atm or less, preferably ranging between about 1 and about 10 atm are used in a method according to the present invention. Preferably, the reaction pressure ranges between about 1.5 and 5 atm.

In a particular embodiment of the method of the present invention, a refractory granular material comprising, but not being limited to, alumina, silica, magnesia, chromia, olivine or mixtures thereof is used as fluidizing agent in the fluidized bed. In such case, the particle size distribution of the fluidizing agent usually ranges between about 300 and about 500 μm.

Such refractory granular material may be used for initiating the gasification reaction only. Indeed, in another particular embodiment of the method of the present invention, the feedstock itself (petcoke or asphaltenic-rich residues) may be used as fluidizing agent. In such mode of operation the particle size distribution of the fluidizing agent generally ranges between about 0.5 and about 2 mm.

In another particular embodiment of the method of the present invention, the raw feedstock may first be pre-dried so that its moisture content ranges between about 5 wt % and about 20 wt %. Any known pre-drying technique may be used.

In a further particular embodiment of the method according to the present invention, the reactor may be further equipped with a bed material withdrawal system to ensure periodic evacuation of excess char/coke, any agglomerates and inorganics. This results in a constant level of solids in the bed. Any variation in the solid quantity inside the bed due to such periodic withdrawal is replaced by an equivalent amount of fresh material introduced through a screw feeder or any other known feeder means. The pressure differential through the bed being related to the level of solids in the bed, it is used as an indicator for the activation of the withdrawal system that will bring the solids to the desired operational level.

Partial Oxidation Reaction

The conversion of heavy petroleum residues such as petcoke and asphaltenic-rich residues into a synthetic gas is a solid-gas reaction that generally couples fluid-dynamics and kinetics.

The fluid-dynamics generally indicate that reacting particles (i.e. the feedstock particles) are converted in the fluidized bubbling bed section until they reach a first threshold particle diameter at which entrainment occurs. Such situation occurs when the terminal velocity of the particle is equal to or lower than the local gas superficial velocity in the upper zone of the bubbling bed section of the reactor. The particles having reached, by reaction in the bubbling bed, a diameter that results in terminal velocities equal to or lower than the local ascending gas superficial velocity, will be entrained into the transition zone between the bubbling bed and the freeboard. In the transition zone and, ultimately, in the freeboard the gas decreases its superficial velocity and the particles continue their conversion until they reach a second threshold particle diameter that corresponds to a terminal velocity equal to or lower than the freeboard superficial gas velocity (a characteristic of the turbulent flow regime imposed in the freeboard, usually between 0.1 and 0.5 m/s at reaction conditions). At such diameter they generally exit the reactor.

Any feedstock particle is thus exposed to conversion in the reactor during a total "residence time" that will be the sum of the residence times in the bubbling fluid bed zone ($\theta bb$), in the transition zone between the bed and the freeboard ($\theta bf$) and in the freeboard itself ($\theta f$). Such residence times are generally function of the particle size of the feedstock and the fluidization conditions used.

For instance, a petcoke particle of 400 μm as initial diameter will typically stay in the bed during $\theta bb$, ranging between about 20 and about 200 seconds, at 975° C. and 9 atm as total pressure (steam partial pressure of about 2.5 atm), until it becomes small enough to be entrained, when varying the fluidization velocity between 10 and 2 times the minimum fluidization velocity using alumina as bed fluidizing agent. Upon entrainment, it will travel during $\theta bf$, ranging between about 1 and about 5 seconds, through the transition zone and will stay during $\theta f$, ranging between about 4 and about 20 seconds, in the freeboard.

Figure 1:
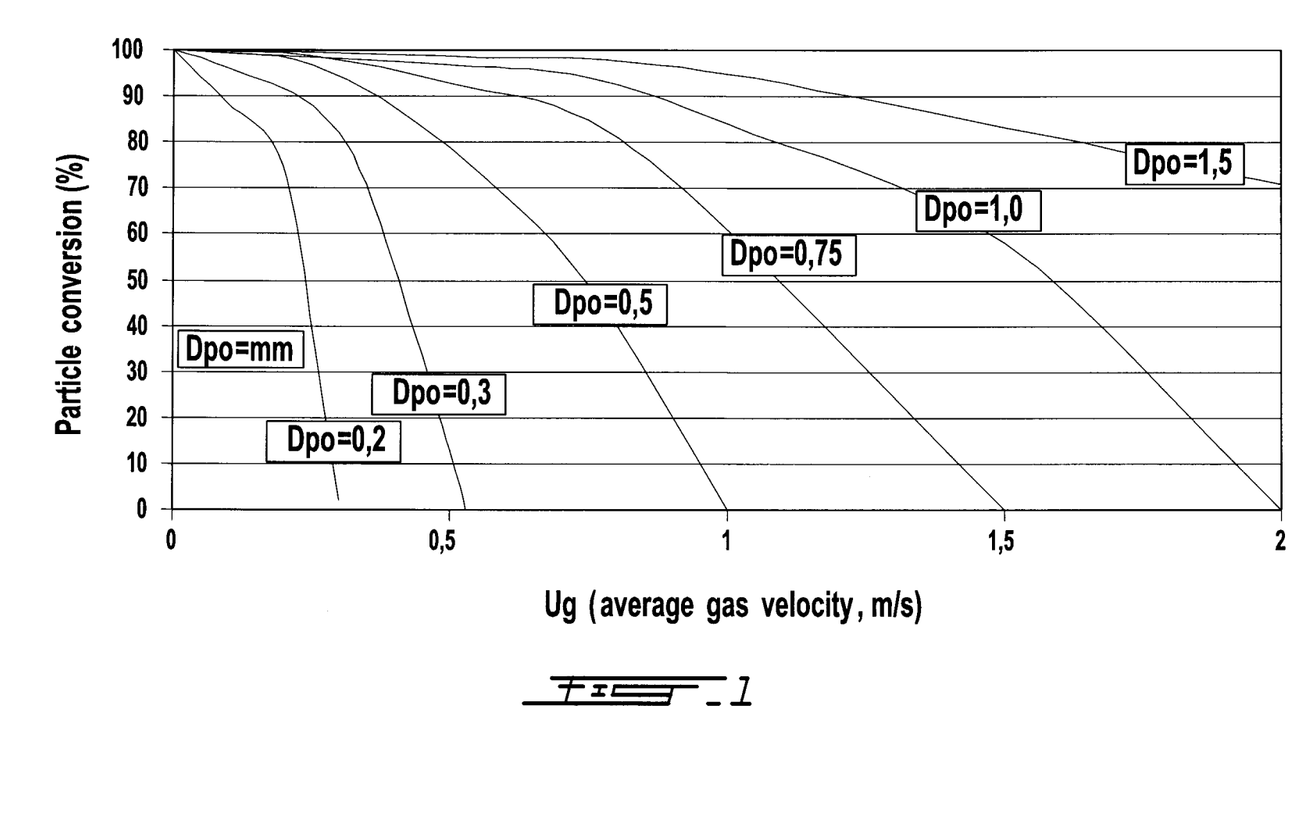
FIG. 1 is a graphic showing an example of the conversion pattern as a function of particle diameter.

An example of the general conversion percentage of petcoke feedstock particles as a function of the average gas velocity (Ug), for varying particle diameters of the original feedstock (Dpo) is shown in FIG. 1. It confirms that small particles (of about 0.3 mm diameter or less) are entrained and converted quickly and at a high percentage by a fluidizing gas having a relatively low average velocity (such as about 0.5 m/s or less). The larger the diameter of the particles entering the gasification reactor, the higher the average gas velocity needed to entrain them and the longer it takes to convert a high percentage of those particles.

The partial oxidation and reforming reactions (which are the dominant chemical events in the overall gasification process) typically take place at temperatures and partial pressures of the reacting gases that are compatible with the residence times above indicated. In the method of the present invention, the reactor is operated at a temperature of about 1000° C. or less and a total pressure of about 10 atm (absolute) or less. This is advantageously achieved, in specific embodiments, by:

(a) appropriate ratios of the input rates of feedstock, oxygen (generally from air or $O_2$-enriched air) and $H_2O$ (liquid water and/or steam). Such typical weight ratios are generally as follows: the ratio $O_2$/feedstock (dry basis) ranges between about 0.3 and about 1.2; the ratio liquid water/feedstock (dry basis) ranges between about 0.05 and about 0.20; and the ratio steam/feedstock (dry basis) ranges between about 0.3 and about 0.7.

(b) the location of the injection ports of the feedstock (generally at between 30 and 60 cm from the nozzles);

(c) the design of the nozzle plate with nozzles generally distanced from each other of between about 16 and about 18 cm, 3 to 4 holes per nozzle and hole velocities generally in the range of about 70 to about 100 m/s;

(d) the height of the bed, generally comprised between about 0.60 m and about 1.0 m at rest;

(e) the particle size distribution of the fluidizing media used, generally as defined above;

(f) the geometric configuration of the transition zone between the bed and the freeboard, with an angle generally varying between about 450 and about 750 and a total height generally ranging between about 1 to about 1.5 m; and/or (g) a regime of well developed turbulent gas flow in the freeboard with Reynolds numbers generally ranging between about 40,000 and about 100,000.

Synthetic Gas Characteristics

Synthetic gas is the main product of a method according to the present invention. A conversion rate of between about 45% to about 85% of the carbon in the feedstock into carbon in the synthetic gas is targeted in the method of the present invention.

The raw synthetic gas produced generally comprises the sulfur components originally present in the heavy petroleum residue feedstock. Average composition ranges for cold synthetic gas (syngas), before and after sulfur removal, may be summarized as follows in Table 4:

TABLE 4

| Component | Average composition ranges (vol %) | |
|---|---|---|
| | Before Sulfur removal | After Sulfur removal |
| $H_2$ | 10-18 | 10-18 |
| CO | 16-20 | 16-20 |
| $CO_2$ | 8-12 | 8-12 |
| $N_2$ + Ar | 56-61 | 56-61 |
| $CH_4$ | 0.8-1.5 | 0.8-1.5 |
| $C_2H_4$ | 0.1-0.5 | 0.1-0.5 |
| $C_2H_6$ | 0-0.2 | 0-0.2 |
| $C_3H_6$ | 0-0.2 | 0-0.2 |
| $C_3H_8$ | 0-0.2 | 0-0.2 |
| other light hydrocarbons | less than 0.5 | less than 0.5 |
| $H_2S$ | less than 1.0 | less than 0.0016 |
| HCl | less than 0.0015 | about 0 |
| $NH_3$ | 0.0003 | 0.0003 |

The level of $H_2S$ of less than 0.0016 vol % after sulfur removal corresponds to the stringiest known level imposed by regulations. However, a higher level may be acceptable in some cases.

Removal of sulfur from the synthetic gas may be performed by any known sulfur removal system, such as, but not limited to, scrubbing using selective absorbents.

Known techniques of gas scrubbing and conditioning may be used on the raw synthetic gas resulting from a method according to the present invention to obtain a clean synthetic gas. For example, wet scrubbing may be used when a cold clean gas is desired, for use in burners/boilers or internal combustion engines for example. Hot gas conditioning may be used when a hot gas is desired, for use in gas turbines or in Integrated Gasifier Combined Cycles (IGCC) for example.

In a particular embodiment of the method according to the present invention when a scrubbing tower is used, any supernatant light tar present in the scrubbing water may be separated by a mixer/decanter and reinjected into the gasifier. Any heavy tar and particulate may be separated and concentrated in a sludge that is thereafter reinjected in the gasifier for additional conversion.

In this or another particular embodiment, a known wastewater treatment unit may be provided downstream of any gas cleaning step.

Tar and particulates may be present in the synthetic gas in an amount up to about 20 ppm (tar) and 5 ppm (particulates).

Removal of $CO_2$ from the synthetic gas using known scrubbing techniques may also be accomplished before or after $H_2S$ removal.

In still a further particular embodiment of the method according to the present invention, a heat recovery unit may be used before a scrubbing tower, which allows for cooling down the synthetic gas to a temperature of about 450° C. or below, while producing steam for export and use for other purposes such as a SAGD application as well as for use in the gasification reactor itself.

There are various applications of a method according to the present invention, including but not limited to its integration in an IGCC process. The clean syngas can be used directly as an energy vehicle, replacing natural gas, using equipment such as a boiler, a gas turbine, a diesel engine or a fuel cell. Thus, the synthetic gas may be used in the production of steam or the coproduction of heat and electricity. It can also be catalytically converted to produce liquid bio-fuels such as methanol, ethanol and higher alcohols.

In a particular embodiment of the method of the present invention, the synthetic gas obtained with air gasification and scrubbing is a clean low calorific value synthetic gas (typically ranging between about 3.7 to about 5.0 MJ/Nm$^3$). In such case, the cleaned synthetic gas, even though having a low calorific value (CV), combusts well with a regular flame. No addition of a higher calorific value gas (such as methane or propane) is needed to stabilize the flame.

In another particular embodiment of the method of the present invention, when using an $O_2$ enrichment of the air, the clean synthetic gas has enhanced calorific values ranging between more than about 5.0 and about 11.5 MJ/Nm$^3$ depending on the level of $O_2$ enrichment.

Solid Residue Characteristics

The solid residues produced by a method according to the present invention are essentially composed of unconverted carbon and inorganics. They are essentially desulfurized and may therefore easily undergo oxidation to generate process heat or electricity for example, without producing undesirable pollutants such as $SO_2$ and without the need of energy and cost-consuming sulfur removal steps prior to combustion. The solid residues may also be thermally oxidized under substoichiometric conditions to generate a mixture of CO and $CO_2$ that may be advantageously used as a reducing chemical gas, and for example be added to the cleaned synthetic gas produced in the gasifier.

Alternatively, such solid residues may be used in cement manufacturing, in suspension boilers, sold to the market (for combustion), as low S coke (0.5 wt % as maximum) or used for electrode manufacturing by aluminum producers. The residues could also be stabilized in construction materials or in aggregates for road surface preparation. In the case of cement manufacturing, the inorganics would then be part of the cement matrix and any carbon present in the residues would be combusted in the kiln.

Desulfurization of unconverted solid residues was not expected in the present case, i.e. at low severities, since gasification of petcoke or other petroleum residues in the industry is generally carried out at higher severities, particularly higher temperatures, with high targeted carbon conversion rates. To the inventor's knowledge, there was no established data on low severity desulfurization, which was thus one of the surprising outcomes of the process of the present invention. Such desulfurization of solid residues unconverted during gasification is advantageous since sulfur is more readily and economically scrubbed from the synthetic gas (in the form of $H_2S$) than it would be removed from solid residues.

The present invention is illustrated in further details by the following non-limiting examples.

EXAMPLE 1

Method Verification Test 1

Test 1 was performed in a pilot plant unit located in Sherbrooke, Quebec, Canada, which is briefly described below.

The pilot plant unit has a nominal capacity of approximately 100 kg/h of petcoke. The fluid bed reactor of the unit is ENERKEM's design. The fluid bed section of the reactor has an internal diameter of 38 cm (15 in) and a height of 3.5 m (138 in). The freeboard has an internal diameter of 63.5 cm (25 in) and a height of 1.4 m (54.5 in). The transition zone is conical and has a 60 degree angle. The nozzle plate has 7 nozzles equipped with 3 holes each (air velocities through the holes are in the 70 to 100 m/s range).

The feedstock is transferred by gravity through two lock hoppers equipped with interconnecting sliding gate valves. From the second lock hopper, the solids move through a rotary valve that controls the solids flow. From the rotary valve, the solids fall onto a screw feeder that rapidly transfers the feedstock directly into the hot zone of the gasifier. The gasification takes place inside the fluid bed with alumina as the fluidizing media. Air and water (steam) were used as the gasification agents for the tests reported as examples. The partial pressure of water (steam) inside the reactor can be adjusted so that the steam-carbon and steam-reforming reactions are appropriately conducted and controlled.

Most of the particles entrained by the hot synthetic gas exiting the gasifier are then captured by two cyclones in series. The efficiency of the cyclones is such that the particles above 10 μm are removed with an efficiency approaching 95%. In the pilot plant, the hot synthetic gas exiting the cyclones is driven into a quenching-scrubbing tower and a high efficiency venturi scrubber. Essentially all the tar is condensed and particles having average dimensions comprised between 1 and 10 μm are collected.

More specifically, the scrubbing gas conditioning is configured as follows:

1) A first loop comprising a quenching-scrubbing tower to cool the synthetic gas and scrub tar and particulates. The outlet gas temperature ranges from about 55 to about 80° C. depending upon water rate; and 2) A second scrubbing loop comprised of a venturi and a demister. The venturi, which captures fine particles, is operated with a pressure loss ranging between 4 and 10 psi; the demister is equipped with a mesh pad to coalesce the entrained fine droplets.

Each loop has its own water recirculation system which cools the water via water-water plate heat exchangers. During quenching-scrubbing, the water (steam) content of the hot synthetic gas is condensed and thus added to the overall water stream. An amount of condensed water is regularly purged out from the system to maintain a constant water circulating rate in the quenching-scrubbing units. The amount purged takes into consideration the water and steam added to the system, the steam having reacted and the water present in the tar/particulate emulsion formed to recycle tar and particulates to the reactor.

The solid gasification residues (collected at the cyclones), and the sludges (from the wastewater treatment) may be reinjected in the gasifier for a better carbon conversion efficiency or may be used for specific applications. The reinjection option was not used in the tests presented as examples. The solid residues from gasification and the scrubbing water were accumulated in receiver vessels. Material balances could thus be evaluated with accuracy.

The clean synthetic gas leaving the demister at room temperature is then ready for use as fuel in a combustion chamber.

The objective of Test 1 was to achieve a carbon conversion to synthetic gas of about 50%. Carbon conversion is defined as the carbon in the synthetic gas molecules (after gas cleaning) divided by the carbon in the feedstock.

The composition of the petcoke used in Test 1 was as follows in Table 5 below (% w/w, dry basis):

TABLE 5

| Inerts (ash) | C | H | O | N | S |
|---|---|---|---|---|---|
| 0.5 | 89.5 | 3.0 | 1.0 | 1.0 | 5.0 |

The higher heating value (HHV) of the dry petcoke feedstock in Test 1 was of 34.2 MJ/kg.

445 kg of petcoke, with a granulometry ranging between 0.1 and 2 mm, were gasified at the pilot plant at 795° C., 1.5 atm, over 4 h in the presence of 709.5 $Rm^3$ air (R corresponding to 25° C., 1 atm; i.e. 842.5 kg air), 37.8 kg water (as moisture in petcoke, i.e. 8.5% of 445 kg), and 212 kg added steam. Alumina was used as fluidizing medium and the feed rate of petcoke into the gasifier was of 111.3 kg/h.

1496.7 $Rm^3$ of syngas (i.e. 1532 kg dry gas and 30.6 kg water) were produced. The specific composition of the syngas obtained in Test 1 is given in Example 3 below. The syngas had a HHV of 4.4 $MJ/Rm^3$ for Test 1.

In Test 1, the equivalent ratio λ (quantity of air used/stoichiometric quantity required for total oxidation) is thus about 0.15, the weight ratio of steam to feedstock is about 0.48 and the weight ratio of liquid water to feedstock is about 0.085.

With 364.4 kg of carbon in the petcoke feedstock and 178.6 kg of carbon in the syngas, carbon conversion to synthetic gas is close to 50% (49%) at the low severity used. The remaining carbon was to be found at 47.7% in the essentially desulfurized solid residues, at 0.3% in the wastewater (as TOC, i.e. total organic carbon and IC, i.e. inorganic carbon) and at 3.3% in the tar, which tar may be recycled into the gasifier for further reaction.

However, the overall energy efficiency is much higher than the conversion rate. The synthetic gas has a $H_2$:CO molar ratio of about 3. The energy content of the syngas produced (6552 MJ in total) is about 42% of the energy contained in the feedstock (15548.3 MJ in total). With 5557.15 MJ in total, the desulfurized gasification residues contain 35.7% of the energy in the feedstock. The heat available and recoverable from cooling via indirect heat exchangers which transform the heat into usable steam represents 452 MJ in total, thus about 3% of the energy in the feedstock. Thus, the total combined energy efficiency is about 80.7% (42.1+35.7+3=80.7). Some further energy of the process is recovered as heat during gas cooling (17.7%) and the rest is lost during GSR recovery. However, this latter heat recovered is low grade heat and has thus not been taken into consideration for energy efficiency calculations.

EXAMPLE 2

Method Verification Test 2

The composition and energy content of the petcoke used in Test 2 were the same as in Test 1 (Example 1).

405 kg of petcoke, with a granulometry ranging between 0.1 and 2 mm, were gasified at the pilot plant at 800° C., 1.5 atm, over 4 h in the presence of 674.0 $Rm^3$ air (R corresponding to 25° C., 1 atm; i.e. 800.3 kg air), 34.43 kg water (as moisture in petcoke, i.e. 8.5% of 405 kg), and 172 kg added steam. Alumina was used as fluidizing medium and the feed rate of petcoke into the gasifier was of 101.3 kg/h.

1338.5 $Rm^3$ of syngas (i.e. 1379.8 kg dry gas and 27.6 kg water) were produced. The specific composition of the syngas obtained in Test 2 is given in Example 3 below. The syngas had a HHV of 4.4 $MJ/Rm^3$ for Test 2.

In Test 2, the equivalent ratio $\lambda$ is about 0.16, the weight ratio of steam to feedstock is about 0.42 and the weight ratio of liquid water to feedstock is about 0.085.

With 331.7 kg of carbon in the petcoke feedstock and 163.5 kg of carbon in the syngas, carbon conversion to synthetic gas is close to 50% (49.3%) at the low severity used. The remaining carbon is to be found at 47.4% in the essentially desulfurized solid residues, at 0.4% in the waste water (as TOC and IC) and at 3.3% in the tar, which tar may be recycled into the gasifier for further reaction.

However, the overall energy efficiency is much higher than the carbon conversion rate. The energy content of the syngas produced (5873 MJ in total) is about 41.6% of the energy contained in the feedstock (14114.25 MJ in total). With 5110.9 MJ in total, the desulfurized gasification residues contain 36.2% of the energy in the feedstock. The heat available and recoverable from cooling represents (taking into account the steam needs of the gasification) 411 MJ, thus about 3% of the energy in the feedstock. Thus, the total combined energy efficiency is about 80.8% (41.6+36.2+3=80.8). Some energy of the process is recovered as heat during gas cooling (17.7%) and the rest is lost during GSR recovery. However, this latter heat recovered is low grade heat and has thus not been taken into consideration for energy efficiency calculations.

EXAMPLE 3

Environmental Data—Tests 1 and 2 Combined

These data were developed during a sampling/analysis campaign carried out during Tests 1 and 2, presented in Examples 1 and 2, respectively. The samplings were made at different stages of the method, for the syngas, the flue gas and the solid residues.

Syngas Sampling

The syngas sampling was conducted after its passage through the cyclones and two-loop scrubbing system ending with the demister, and before the combustion chamber, and analysis of samples was performed by standard Gas Chromatography (GC) methods at given times during the tests.

Figure 2:
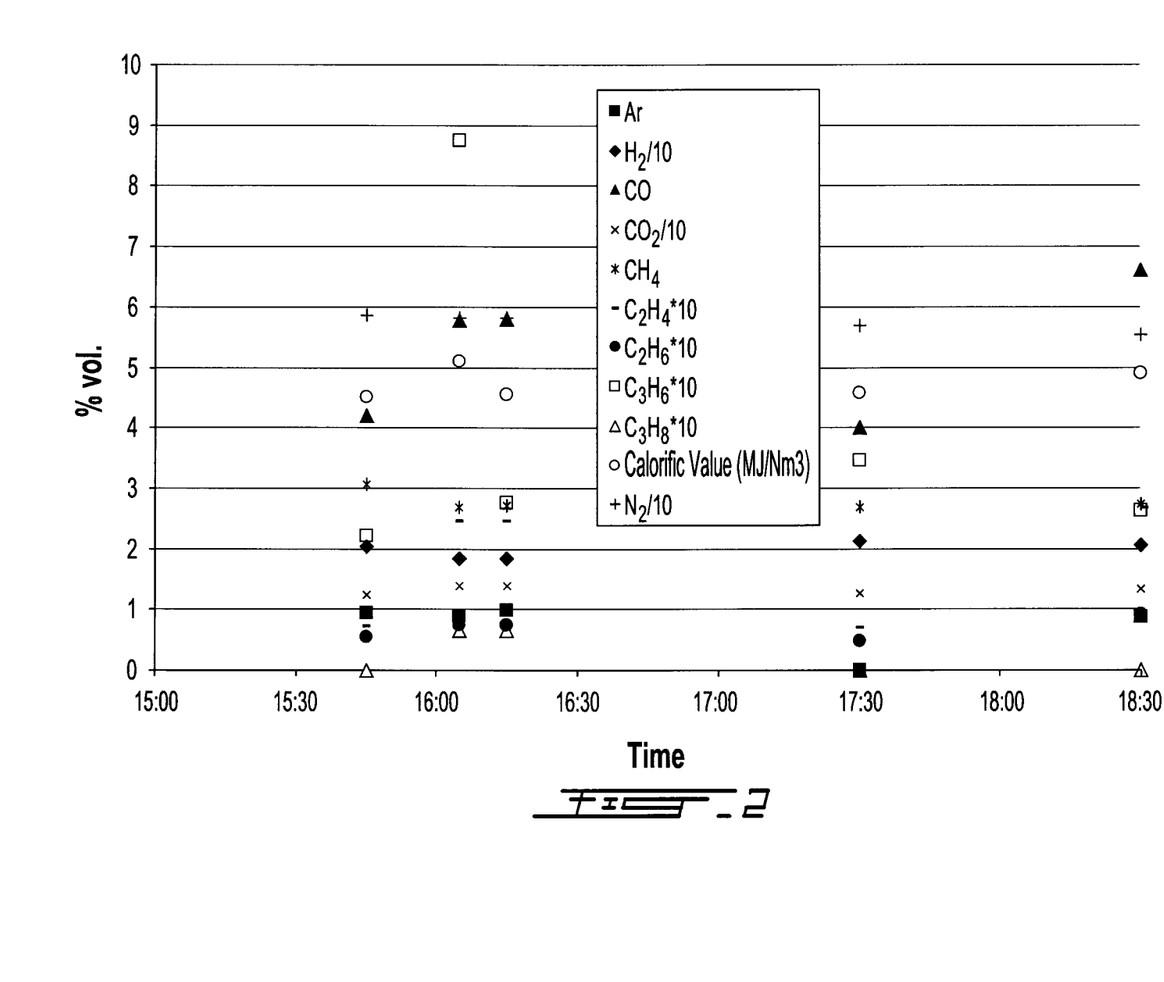
FIG. 2 is a graphic showing the syngas composition obtained from Test 1.
Figure 3:
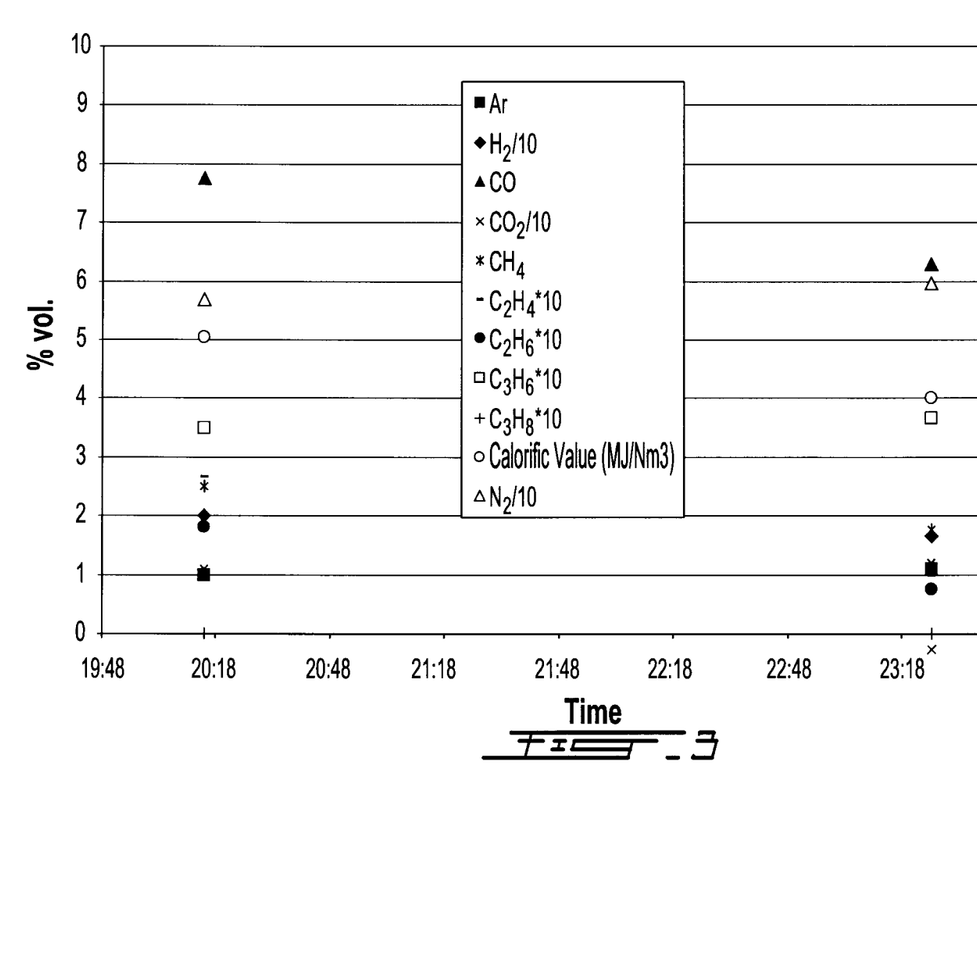
FIG. 3 is a graphic showing the syngas composition obtained from Test 2.

FIGS. 2 and 3, as well as Table 6 below, clearly show that a stable syngas composition is obtained throughout the 4 h tests. Table 6 gives the syngas average composition for each test.

TABLE 6

| Types | Test 1 | Test 2 |
|---|---|---|
| $N_2$ | 57.8 | 57.8 |
| Ar | 0.8 | 1 |
| $H_2$ | 19 | 18.3 |
| CO | 5.9 | 7.7 |
| $CO_2$ | 13 | 12.3 |
| $CH_4$ | 2.8 | 2.2 |
| $C_2H_4$ | 0.2 | 0.2 |
| $C_2H_6$ | 0.1 | 0.1 |
| $C_3H_6$ | 0.3 | 0.4 |
| $C_3H_8$ | 0.0 | 0.0 |
| $C_xH_y$ | 0.0 | 0.0 |

Flue Gas Sampling

The flue gas sampling was conducted at the stack, following the combustion chamber. The two sampling train ports were located further than 2 diameters upstream from any source of disturbance and 4.5 diameters after the elbow at the exit of the combustion chamber. The total stack height was 7.5 m, extending 2.0 m above the roof. The stack had an internal diameter of 0.47 m. Methods and procedures used were standard.

Table 7 below summarizes the main results obtained for the flue gas sampling at the combustion chamber outlet.

TABLE 7

Atmospheric emission summary (following combustion of the syngas)

| Categories | Descriptions | Test 1 | Test 2 | Estimation for Industrial Plant | Units |
|---|---|---|---|---|---|
| Continuous sampling (average)* | $O_2$ | 7.83 | 8.48 | 4 | % |
| | $CO_2$ | 6.88 | 6.39 | 13 | % |
| | CO | 0.76 | 1.61 | 1 | $mg/Rm^3$ |
| | $SO_2$** | 65.32 | 70.41 | <50 | $mg/Rm^3$ |
| | $NO_x(NO_2)$ | 76.26 | 59.38 | 50 | PPMV Dry basis |
| | THC ($CH_4$) | 4.07 | 4.41 | 4 | PPMV Wet basis |
| D&F-TEQ* | Total Equiv. | 0.025 | 0.026 | 0.025 | $ng/Rm^3$ |
| Particles* | Total | 6.4 | 6.4 | 6.4 | $mg/Rm^3$ |
| HCl* | Total | 1 | 0.6 | 0.8 | $mg/Rm^3$ |
| Metals* | Chromium | 18.67 | 28.24 | 23 | $\mu g/Rm^3$ |
| | Mercury | 7.29 | 0.15 | 4 | $\mu g/Rm^3$ |
| | Lead | 13.76 | 11.83 | 12 | $\mu g/Rm^3$ |
| | Cadmium | 1.80 | 2.21 | 2 | $\mu g/Rm^3$ |
| PAH | Total | 17.23 | 17.33 | 17 | $\mu g/Rm^3$ |

It is to be noted that the measures noted (*) are corrected (except for $O_2$) at 11% $O_2$, for proper comparison, using the following equation:

$$\text{Concentration at 11\% } O_2 = \frac{\text{Concentration at \% } O_2 \text{ in the stack} \times 9.9}{20.9 - \% \, O_2 \text{ in the stack}}$$

R in $Rm^3$ refers to flue gas conditions defined as follows: temperature, 25° C.; pressure, 101.3 kPa; oxygen content, 11 vol %; water (moisture) content, 0 vol % (dry conditions).

Emissions of CO, dioxins and furans (D&F) were as low as 0.76 mg/$Rm^3$ and 0.025 ng/$Rm^3$ for Test 1 and 1.61 mg/$Rm^3$ and 0.026 ng/$Rm^3$ for Test 2, which is well below most of the current environmental regulations in the western world. The levels of D&F-TEQ (TEQ: Toxic EQuivalency) may be further decreased by filtering the air used for the combustion of the synthetic gas, thereby eliminating particulates carrying chloride salts present in the ambient air, and/or via additional gas conditioning steps specific to chlorine-containing compounds, using lime injection for example.

The absence of a reactive absorption unit in the pilot plant explains why rather high $SO_2$ levels were obtained in Tests 1 and 2. Only low levels of caustic (pH-9.6) were used in loop 1. They proved insufficient to capture the $H_2S$ at levels that upon combustion of the synthetic gas would result in $SO_2$ emissions lower than regulations. Such situation may readily be fixed via, for instance, an amine absorption system.

Solid Sampling

Solid sampling, for the Gasification Solid Residues (GSR), was conducted in the collection containers following the cyclones, and analysis was performed by standard methods, including a lixiviation test, by an independent laboratory.

213 kg of GSR were collected over the 4 h Test 1, of which 8.2 kg were moisture and 173.7 kg were carbon (i.e. 47.7% of the carbon originally present in the feedstock). In Test 2, 193 kg of GSR were collected, of which 7.4 kg were moisture and 157.4 kg consisted in carbon (i.e. 47.4% of the carbon originally present in the feedstock).

Table 8 below summarizes the main analytical results obtained for the leachate profile of the mixed gasification solid residues from Tests 1 and 2. The lixiviation profiles have shown that such residues comply with environmental regulations, and may thus be used as ground cover or deposited in landfills.

TABLE 8

Gasification solid residues composition summary

| PARAMETERS | UNITS | PETCOKE |
|---|---|---|
| Miscellaneous inorganics | | |
| Ammonia (N) | mg/L | <1 |
| Cyanide (CN) | mg/L | <0.1 |
| Fluoride (F) | mg/L | 2 |
| Nitrate ($NO_3$) | mg/L | <0.2 |
| Nitrite ($NO_2$) | mg/L | <0.2 |
| Sulfur (S) | wt % | 0.58 |
| Metals (Leachate) | | |
| Antimony (Sb) | mg/L | <0.0002 |
| Arsenic (As) | mg/L | <0.5 |
| Barium (Ba) | mg/L | 0.5 |
| Beryllium (Be) | mg/L | <0.1 |
| Boron (B) | mg/L | 0.1 |
| Cadmium (Cd) | mg/L | <0.1 |
| Chromium (Cr) | mg/L | <0.1 |
| Cobalt (Co) | mg/L | <0.1 |
| Copper (Cu) | mg/L | <0.1 |
| Iron (Fe) | mg/L | 0.61 |
| Lead (Pb) | mg/L | <0.1 |

TABLE 8-continued

Gasification solid residues composition summary

| PARAMETERS | UNITS | PETCOKE |
|---|---|---|
| Mercury | μg/L | <5 |
| Nickel (Ni) | mg/L | <0.1 |
| Selenium (Se) | mg/L | <0.5 |
| Silver (Ag) | mg/L | <0.1 |
| Thallium (Tl) | mg/L | <0.0003 |
| Uranium (U) | mg/L | <0.0004 |
| Vanadium (V) | mg/L | 0.2 |
| Zinc (Zn) | mg/L | 0.3 |
| Zirconium (Zr) | mg/L | 0.0047 |
| Miscellaneous | | |
| Fly ash | mg/kg | 750000 |
| Heating value | kJ/kg | 31905 |
| Moisture content | % | 0.2 |

Wastewater

The raw (untreated) wastewater from the pilot plant is characteristic of wastewater from a petrochemical complex. Known treatment technology would readily permit to clean the water and use it in recycle loops. The final residue of the wastewater treatment would be a sludge containing precipitated suspended solids and metals as hydroxides. All the organic compounds may be destroyed by either thermo-chemical oxidation or biological methods. Alternatively, a fraction of the carbon-rich gasification solid residues may be used to remove organics that are reintroduced and converted in the gasifier.

EXAMPLE 4

Aiming at rather high carbon conversions a run was made during 72 hours to stabilize the reactor and data for material and energy balances was taken during 3 h with the temperature of the fluid bed at 950° C. by adjusting the inputs flows of petcoke (112.5 kg/h), air (375 $Rm^3$/h which is equivalent to 443.4 kg/h), water (9.6 kg/h as humidity in petcoke) and steam (51.6 kg/h). The pressure in the fluid bed was 1.5 atm. Air was added partly (70%) through the nozzles at the bottom of the fluid bed, partly (15%) through the feeding screw with the difference equally split among three nozzles located just above the expanded fluid bed, at the exit of the transition zone and at the upper third of the freeboard, respectively. The steam was added, equally split, to the air through those nozzles. The freeboard of the gasifier was maintained at a temperature just below 950° C. The fluidizing medium was initially alumina but by regular removal of the fluidizing solids in the bed to maintain the bed height at a constant level, the bed after 48 hours of operation was constituted mainly of the unconverted petcoke particles, which became, de facto, the fluidizing medium.

In Example 4, the equivalence ratio λ was of about 0.34, the weight ratio of steam to feedstock was of about 0.46 and the weight ratio of liquid water to feedstock was of about 0.085.

The yields of the different products were as follows in Table 9 (with R: 25° C., 1 atm absolute):

TABLE 9

| Product | Rate of production | Equivalent in kg/kg of petcoke (dry basis) |
|---|---|---|
| Syngas | 501 $Rm^3$/h | 4.9 $Rm^3$/kg petcoke |
| Fines | 15.6 kg/h | 0.152 kg/kg of petcoke |
| Tar | 2.7 kg/h | 0.022 kg/kg of petcoke |
| Organics | 0.9 kg/h | 0.009 kg/kg of petcoke |

The carbon conversion rate into syngas was about 82.5%. The synthetic gas composition obtained (no $H_2S$ remains) is as follows (vol %): $N_2$, 58.2; Ar, 1.0; $H_2$, 10.8; CO, 19.2; $CO_2$, 8.8; $CH_4$, 0.8; $C_2H_4$, 0.25; $C_xH_y$, 0.05; others (mainly $H_2S$ with some COS and $NH_3$), 0.90. Removal of $H_2S$ and COS by known selective absorption methods will bring $H_2S$ levels in clean synthetic gas to a vol % of 0.0075 (calculated number).

The energy efficiencies obtained in this Example 4 can be determined from the calorific value of the synthetic gas [4.1 $MJ/Rm^3$ as HHV and 3.9 $MJ/Rm^3$ as LHV, R25° C. and 1 atm] as follows (for the 3 h run):

$$\frac{\text{Energy content }(LHV)\text{ of the synthetic gas}}{\text{Energy content }(LHV)\text{ of the petcoke}} = \frac{1953.9 \text{ MJ}}{3521.3 \text{ MJ}} = 0.55; \quad (a)$$

$$\frac{\text{Energy content }(LHV)\text{ of the fines}}{\text{Energy content }(LHV)\text{ of the petcoke}} = \frac{499.2 \text{ MJ}}{3521.3 \text{ MJ}} = 0.14; \quad (b)$$

$$\frac{\text{Energy content }(LHV)\text{ of tar}}{\text{Energy content }(LHV)\text{ of the petcoke}} = \frac{49.4 \text{ MJ}}{3521.3 \text{ MJ}} = 0.01; \quad (c)$$

$$\frac{\text{Energy recovered from the heat recovery unit}}{\text{Energy content }(LHV)\text{ of the petcoke}} = \frac{356.4 \text{ MJ}}{3521.3 \text{ MJ}} = 0.10; \quad (d)$$

The so calculated overall energy efficiency for example 4 is thus 0.80.

The steam used in Example 4 would require about 150 MJ of input energy to be produced in a steam generator (efficiency 80%). Such energy would normally be taken from the system, thus lowering the "Energy recovered in the heat recovery unit" to 206.4 MJ (rather than 356.4 MJ) and the overall net energy efficiency is thus established at about 75.8%.

EXAMPLE 5

The present invention can also advantageously be carried out as follows, on an industrial scale.

Figure 4:
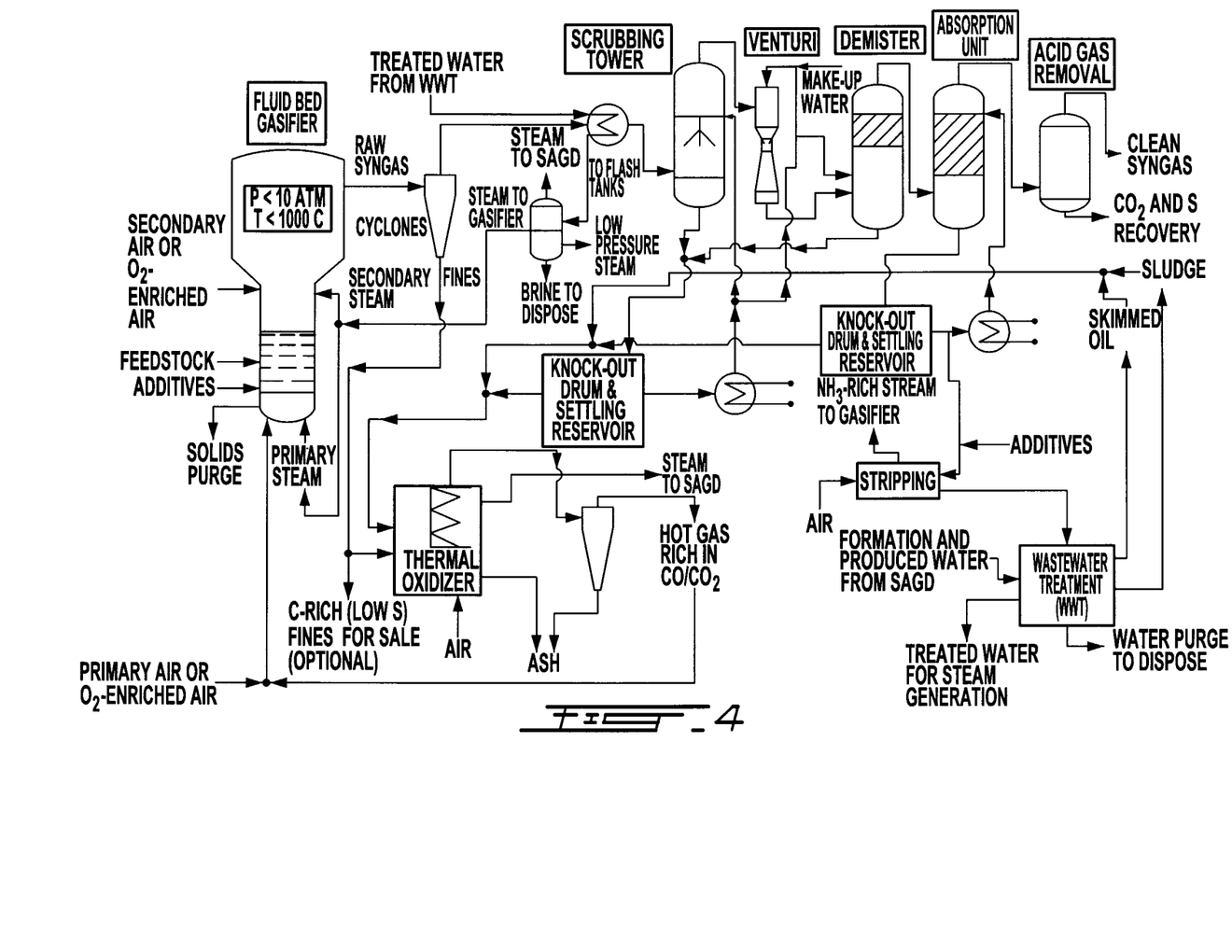
FIG. 4 is a process flow diagram for the industrial gasification of petcoke and other heavy petroleum residues as in Example 5.

A process flow diagram showing the different components of the industrial unit used in Example 5 is shown in FIG. 4. The gasification reactor's turndown ratio is 2.5/1 and 300,000 t per year of petcoke or other feedstock are processed to synthetic gas. The gas scrubbing or conditioning is similar to that described in Example 1 above, with cyclones followed by a scrubbing tower, a venturi and a demister. Removal of $H_2S$ is made after drying of the syngas. The fines collected by the cyclones, which are desulfurized solid residues, are thermally oxidized to produce a gas rich in $CO/CO_2$, which can be added to the originally produced syngas or directly used for the generation of steam. The industrial unit further comprises an integrated heat recovery/steam production system associated to the cyclones and another heat recovery system associated to other gas scrubbing components of the unit, as well as an on-site wastewater treatment unit that allows recycling water within the system, for example for steam production via a Once Through Steam Generation system.

The composition of the petcoke used in Example 5 is the same as that of Examples 1 and 2. The average carbon conversion ranges between about 76 and 82%.

37,500 kg/h petcoke at 8.5% moisture, with a granulometry ranging between 0.1 and 2 mm are gasified at a temperature ranging between 950 and 980° C. and a pressure of about 9 atm, in the presence of 125,000 $Rm^3$/h air (i.e. 147,805 kg/h) and 17,156 kg/h added steam at 10 atm. Thus the λ (lambda) ratio is about 0.37, the weight ratio of steam to feedstock is about 0.46 and the weight ratio of liquid water to feedstock is about 0.085. 191.8 kg/h of calcinated dolomite are also added to the gasifier as a MgO source to neutralize any chloride element present in the feedstock. The fluid bed is initially constituted by alumina and progressively by unconverted carbon particles, which become the fluidizing medium itself, as explained in Example 4.

167,250 $Rm^3$/h syngas are produced (i.e. 183,326 kg/h dry gas and 2567 kg/h moisture). The composition of the syngas obtained in this Example is given in Table 10 below. The dry syngas has a HHV of 4.1 $MJ/Rm^3$.

TABLE 10

| Types | Before $H_2S$ removal | After $H_2S$ removal |
|---|---|---|
| $N_2$ | 58.3 | 58.7 |
| Ar | 1.3 | 1.3 |
| $H_2$ | 10.7 | 10.8 |
| CO | 19.1 | 19.2 |
| $CO_2$ | 8.8 | 8.9 |
| $CH_4$ | 0.8 | 0.8 |
| $C_2H_4$ | 0.3 | 0.3 |
| $C_2H_6$ | 0.0 | 0.0 |
| $C_3H_6$ | 0.0 | 0.0 |
| $C_3H_8$ | 0.0 | 0.0 |
| $C_xH_y$ | 0.05 | 0.05 |
| $H_2S$ | 0.74 | 0.0075 |
| $NH_3$ | 0.0003 | 0.0003 |
| Cl | 0.0015 | 0.0000 |

With regard to the mass balance of the petcoke to syngas industrial unit, it is noted that the carbon conversion between petcoke and synthetic gas is of 79 wt % (30,710 kg/h carbon in the petcoke feedstock, as compared to 24,263 kg/h carbon in the syngas produced). It is equivalent to 4874 $Nm^3$ syngas/tonne of petcoke (dry basis). The net steam produced for export from the heat recovery system represents 1.0 ton of steam (1500 Psia, saturated) per ton of petcoke (dry basis). The fines collected represent 0.179 ton/ton of petcoke (dry basis). The tar represents 22 kg/ton of petcoke (dry basis) and is injected into the gasifier or the fines combustion unit. If the fines and the tar are combusted with an efficiency of 80% they will produce 1.9 ton of steam (1500 Psia, saturated) per ton of petcoke (dry basis).

With regard to the energy balance of the industrial unit, the energy contained in the synthetic gas produced represents 56.1% of the energy contained in the initial petcoke (dry basis). Furthermore, the energy contained in the net steam produced from the heat recovery system corresponds to 10.3% of the energy contained in the initial petcoke (dry basis). The energy content of the petcoke fines collected at the cyclone represents 14.2% of the energy contained in the initial petcoke (dry basis). Finally, the energy content of the tar collected at the skimmer/decanter represents 1.1% of the energy content of the initial petcoke (dry basis). The overall energy efficiency of the industrial unit is thus 81.7% (less the energy fraction required for a sulfur removal plant). This value is higher than the efficiency value of Example 4 due to an improved heat integration system included in the design of the industrial unit.

344 kg/h solids are collected from the gasifier and 5,739 kg/h total solids are collected from the cyclones. Thus a total of 6,083 kg/h gasification solid residues is produced, of which 251 kg/h are moisture and about 5,482 kg/h represents carbon (i.e. 17.9% of the carbon originally present in the feedstock).

Wastewater recovered after the gas scrubbing system undergoes known treatment steps onsite in the industrial plant. Table 11 below presents the estimated wastewater composition after such treatment.

TABLE 11

Wastewater characteristics summary

| Categories | Descriptions | Units | Estimated Wastewater Composition for Industrial Plant After Treatment |
|---|---|---|---|
| Oil and Grease | Total | mg/L | 1.9 |
| PAH | Total | μg/L | <5 |
| PCB | Total | μg/L | <0.03 |
| Inorganics | Suspended solids (total) | mg/L | <170 |
| | Phosphorus (total) | mg/L | <2.2 |
| | Fluoride | mg/L | <10 |
| Other | Cyanide (total) | mg/L | 0.1 |
| Organics | $BOD_5$ | mg/L | 14.6 |
| | TKN | mg/L | 31.4 |
| Metals | Silver | mg/L | <0.02 |
| | Aluminum | mg/L | <3.1 |
| | Cobalt | mg/L | <0.28 |
| | Lead | mg/L | <2 |
| | Zinc | mg/L | <0.05 |
| Others | Volatiles (BTEX) | μg/L | <1500 |
| | Phenols-4AAP | mg/L | 0.06 |

EXAMPLE 6

An asphaltenic-rich residue feedstock ground to about 1-2 mm and produced as the bottom fraction of a vacuum distillation operation was used in this Example, in the Pilot Plant unit as described in Example 1. Such feedstock had the composition presented in Table 12 below (% w/w, dry basis):

TABLE 12

| Inerts (ash) | C | H | O | N + S |
|---|---|---|---|---|
| 3.2 | 83.2 | 8.3 | 0.3 | 4.9 |

Aiming at rather high carbon conversions, the asphaltenic-rich residue was gasified during 72 hours to stabilize the reactor and data for material and energy balances was taken during 6 h with the temperature of the fluid bed at 940° C. by adjusting the inputs flows of solids (113.6 kg/h), air (375.2 $Rm^3$/h which is equivalent to 443.4 kg/h), water (10.7 kg/h as humidity in the solids) and steam (51.6 kg/h). The pressure in the fluid bed was 1.45 atm. Air was added partly (72%) through the nozzles at the bottom of the fluid bed, partly (13%) through the feeding screw with the difference equally split among three nozzles located just above the expanded fluid bed, at the exit of the transition zone and at the upper third of the freeboard, respectively. The steam was added, equally split, to the air through those nozzles. The λ (lambda) ratio in this example was about 0.28. The freeboard of the gasifier was maintained at a temperature just below 950° C. The fluidizing medium was initially alumina but by regular removal of the fluidizing solids in the bed to maintain the bed height at a constant level, the bed after 48 hours of operation was constituted mainly of the unconverted carbon particles (derived from asphaltene) which became, de facto, the fluidizing medium, as explained above.

The yields of the different products were as follows in Table 13 (with R: 25° C., 1 atm absolute):

TABLE 13

| Product | Rate of production | Equivalent in kg/kg of petcoke (dry basis) |
|---|---|---|
| Syngas | 509.3 $Rm^3$/h | 4.95 $Rm^3$/kg petcoke |
| Fines | 15.9 kg/h | 0.155 kg/kg of petcoke |
| Tar | 1.85 kg/h | 0.018 kg/kg of petcoke |
| Organics | 1.03 kg/h | 0.010 kg/kg of petcoke |

The carbon conversion rate into gas was about 82.4%. The synthetic gas composition obtained (before $H_2S$ scrubbing) is as follows (vol %) in Table 14:

TABLE 14

| Types | Vol % |
|---|---|
| $N_2$ | 58.3 |
| Ar | 0.9 |
| $H_2$ | 10.9 |
| CO | 19.1 |
| $CO_2$ | 9.0 |
| $CH_4$ | 0.8 |
| $C_2H_4$ | 0.25 |
| $C_xH_y$ | 0.05 |
| $H_2S$ + COS + $NH_3$ | 0.7 |

Removal of $H_2S$ and COS by known selective absorption methods will bring $H_2S$ levels in the clean synthetic gas to a trace level.

The energy efficiencies in this Example 6 as determined from the calorific value of the synthetic gas [4.1 MJ/$Rm^3$ as HHV and 3.9 MJ/$Rm^3$ as LHV, R25° C. and 1 atm] are as follows:

(a) ratio of the LHVs of the synthetic gas to the asphaltenic feedstock: 0.55;

(b) ratio of the LHV of the fines to the asphaltenic feedstock: 0.14;

(c) ratio of the LHV in the organics to the asphaltenic feedstock: 0.01; and (d) energy recovered in the different heat recovery units: 0.10.

The overall energy efficiency is thus 0.80.

The steam used in Example 6 would require about 150 MJ/h of input energy to be produced in a steam generator (efficiency 80%). Such energy would normally be taken from the system, thus lowering the overall net energy efficiency to about 75.8%.

Although the present invention has been described hereinabove by way of specific embodiments thereof, it can be modified, without departing from the nature and scope of the subject invention as defined in the appended claims.

What is claimed is:

1. A method for the co-production of a sulfur-containing raw synthetic gas and an essentially desulfurized carbon-containing solid residue from a sulfur-containing heavy petroleum residue feedstock selected from the group consisting of petcoke, an asphaltenic-rich residue, and combinations thereof, the method consisting essentially of:

(a) feeding a particulate sulfur-containing heavy petroleum residue feedstock into a bubbling fluidized-bed reactor with a residence time of less about 4 minutes or less;

(b) converting said sulfur-containing heavy petroleum residue feedstock to a sulfur-containing raw synthetic gas by partial oxidation reaction of said feedstock, the partial oxidation reaction taking place in the bubbling fluidized-bed gasification reactor in the presence of water and a partial oxidation agent at a temperature of 1000° C. or less and a pressure of about 10 atm or less, thereby also producing an essentially desulfurized carbon-containing solid residue that contains between about 47% wt to about 55% wt of an initial amount of carbon in the feedstock; and (c) separately recovering the essentially desulfurized carbon-containing solid residue and the sulfur-containing raw synthetic gas, wherein all reactions involved in the co-production method, including consumption of $O_2$ from air as an oxidant from the partial oxidation agent, steam-reforming reactions, carbon-steam reactions and cracking reactions, take place in the bubbling fluidized-bed gasification reactor at 1000° C. or less, along with the partial oxidation reaction.

2. The method of claim 1, wherein the asphaltenic-rich residue is asphaltene.

3. The method of claim 1, wherein the particulate sulfur-containing heavy petroleum residue feedstock fed into the gasification reactor at step (a) has a particle size distribution ranging between about 0.1 and about 5 mm.

4. The method of claim 1, further comprising controlled crushing of the particulate sulfur-containing heavy petroleum residue feedstock before the feeding step (a), thereby obtaining a feedstock with a predetermined particle size distribution.

5. The method of claim 1, wherein the predetermined particle size distribution ranges between about 0.1 and about 5 mm.

6. The method of claim 1, wherein the partial oxidation reaction is conducted with air.

7. The method of claim 1, wherein the partial oxidation reaction is conducted with oxygen-enriched air.

8. The method of claim 1, wherein water is provided in a state selected from the group consisting of a liquid, a gas, and combinations thereof.

9. The method of claim 1, wherein the reaction pressure is more than about 1 atm and less than about 10 atm.

10. The method of claim 1, wherein the reaction temperature ranges between 780° C. and 1000° C.

11. The method of claim 5, wherein an equivalent ratio $\lambda$ for air in the gasification reactor ranges between about 0.15 and about 0.5.

12. The method of claim 8, wherein water is provided in both steam and liquid forms, wherein a weight ratio of steam to feedstock ranges between about 0.3 and about 0.7.

13. The method of claims 1, wherein a fluidizing agent in the bubbling fluidized-bed gasification reactor is a refractory material comprising one selected from the group consisting of silica, alumina, olivine, magnesia, chromia, and combinations thereof.

14. The method of claim 13, wherein the fluidizing agent has a particle size diameter between about 300 and about 500 μm.

15. The method of claim 13, wherein the bubbling fluidized-bed gasification reactor is operated under a bubbling fluidization regime characterized by velocities ranging between more than 0.6 and about 1.8 m/s.

16. The method of claim 1, wherein a fluidizing agent in the bubbling fluidized-bed gasification reactor is the particulate sulfur-containing heavy petroleum residue feedstock itself.

17. The method of claim 16, wherein the fluidizing agent is petcoke, and wherein said petcoke has a particle size distribution between about 0.5 and about 2 mm.

18. The method of claim 16, wherein the fluidizing agent is asphaltene and wherein said asphaltene has a particle size distribution between about 0.5 and about 2 mm.

19. The method of claim 16, wherein the bubbling fluidized-bed gasification reactor is operated under a bubbling fluidization regime characterized by velocities ranging between about 0.2 and about 0.6 m/s.

20. The method of claim 6, wherein one selected from the group consisting of air, water, and combinations thereof, is injected into the gasification reactor at multiple predetermined locations, thereby allowing the partial oxidation reaction to be carried out in a staged fashion.

21. The method of claim 1, further comprising a removal of sulfur from the sulfur-containing raw synthetic gas.

22. The method of claim 1, further comprising a removal of sulfur from the sulfur-containing raw synthetic gas by scrubbing.

23. The method of claim 19, further comprising a removal of $CO_2$ from the synthetic gas, before or after the removal of sulfur.

24. The method of claim 19, further comprising a removal of $CO_2$ from the synthetic gas, before or after the removal of sulfur by scrubbing.

25. The method of claim 1, further comprising a heat recovery that cools down the synthetic gas to about 400° C. while producing steam for export.

26. The method of claim 1, further comprising an intermittent withdrawal of solids to manage a solid build up at a bottom part of the gasification reactor.

27. The method of claim 1, further comprising pre-drying the particulate and sulfur-containing heavy petroleum residue feedstock prior to the feeding step (a) into the gasification reactor.

28. The method of claim 27, wherein the pre-dried feedstock has a moisture content of about 8.5 wt % or less.

29. A method for gasifying a sulfur-containing petroleum heavy residue feedstock selected from the group consisting of petcoke, an asphaltenic-rich residue, and combinations thereof, under low severity conditions, the method consisting essentially of [comprising]:

(a) feeding a particulate sulfur-containing heavy petroleum residue feedstock into a bubbling fluidized-bed gasification reactor with a residence time of about 4 minutes or less;

(b) converting said sulfur-containing heavy petroleum residue feedstock to a sulfur-containing raw synthetic gas by a partial oxidation reaction of the feedstock, the partial oxidation reaction taking place in the bubbling fluidized-bed gasification reactor in the presence of water and a partial oxidation agent at a temperature of 1000° C. or less and a pressure of about 10 atm or less, thereby also producing an essentially desulfurized solid residue that contains between about 47% wt to about 55% wt an initial amount of carbon in the feedstock; and (c) selectively recovering the sulfur-containing raw synthetic gas, wherein all reactions involved in the gasification method, including consumption of $O_2$ as an oxidant from the partial oxidation agent, steam-reforming reactions, carbon-steam reactions and cracking reactions, take place in the bubbling fluidized-bed gasification reactor at 1000° C. or less, along with the partial oxidation reaction.

30. The method according to claim 1, wherein the essentially desulfurized carbon-containing solid residue contains at least about 47% by weight of an initial amount of carbon in the feedstock.

31. The method according to claim 29, wherein the essentially desulfurized solid residue contains at least about 47% by weight of the initial amount of carbon in the feedstock.

* * * * *